(12) United States Patent
Ito et al.

(10) Patent No.: US 6,548,137 B2
(45) Date of Patent: Apr. 15, 2003

(54) PHASE-CHANGE OPTICAL RECORDING MEDIUM AND RECORDING METHOD AND APPARATUS FOR THE SAME

(75) Inventors: Kazunori Ito, Kanagawa (JP); Michiharu Abe, Kanagawa (JP); Makoto Harigaya, Kanagawa (JP); Takashi Shibaguchi, Kanagawa (JP); Eiko Suzuki, Kanagawa (JP); Nobuaki Onagi, Kanagawa (JP); Hiroko Tashiro, Kanagawa (JP); Yoshiyuki Kageyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/568,723

(22) Filed: May 11, 2000

(65) Prior Publication Data

US 2003/0031823 A1 Feb. 13, 2003

(30) Foreign Application Priority Data

May 12, 1999 (JP) ............................................. 11-131926

(51) Int. Cl.[7] ............................... B32B 3/02; G11B 7/00
(52) U.S. Cl. .................................... 428/64.1; 369/59.12
(58) Field of Search ............................... 428/64.1, 64.4, 428/64.5, 913; 430/270.13, 495.1, 945; 369/59.11, 59.12, 116, 124.4

(56) References Cited

U.S. PATENT DOCUMENTS

| | | | |
|---|---|---|---|
| 4,714,667 A | 12/1987 | Sato et al. | 430/270 |
| 4,767,693 A | 8/1988 | Oba et al. | 430/270 |
| 4,891,305 A | 1/1990 | Oba et al. | 430/495 |
| 5,011,723 A | 4/1991 | Harigaya et al. | 428/64 |
| 5,024,927 A | 6/1991 | Yamada et al. | 430/495 |
| 5,080,947 A | 1/1992 | Yamada et al. | 428/64 |
| 5,100,700 A | 3/1992 | Ide et al. | 428/64 |
| 5,156,693 A | 10/1992 | Ide et al. | 148/403 |
| 5,196,250 A | 3/1993 | Abe et al. | 428/64 |
| 5,736,657 A | 4/1998 | Ide et al. | 75/230 |
| 5,785,828 A | 7/1998 | Yamada et al. | 204/298.13 |
| 5,948,496 A | 9/1999 | Kinoshita et al. | 428/64.1 |
| 6,004,646 A * | 12/1999 | Ohno | 428/64.1 |
| 6,108,295 A * | 8/2000 | Ohno | 369/275.2 |
| 6,115,352 A * | 9/2000 | Ohno | 369/275.4 |
| 6,143,468 A * | 11/2000 | Ohno | 430/270.13 |
| 6,177,166 B1 * | 1/2001 | Ohno | 428/64.1 |
| 6,391,417 B1 * | 5/2002 | Yuzurihara | 428/64.1 |
| 6,438,085 B1 * | 8/2002 | Kato | 369/59.12 |

* cited by examiner

Primary Examiner—Elizabeth Mulvaney
(74) Attorney, Agent, or Firm—Cooper & Dunham LLP

(57) ABSTRACT

An optical recording medium has a phase-change recording layer containing Sb and Te as essential elements therefor, to which is added at least one element selected from the group consisting of Ag, Au, Cu, Zn, B, Al, Ga, In, Si, Ge, Sn, Pb, N, P, Bi, La, Ce, Cd, and Tb, the recording layer being capable of assuming an amorphous phase changed from a crystalline phase by the application of a laser beam thereto, thereby optically recording information. Recording marks are formed in the recording medium by converting a light emission wave of laser beam into a recording pulse train comprising a plurality of on-pulses and off-pulses, with a recording frequency being continuously changed corresponding to the location of each of the recording marks in the radial direction of said recording medium. A recording apparatus has laser beam driving circuit means, signal generation means, and signal transmission means for achieving the above recording method.

10 Claims, 5 Drawing Sheets

PHASE-CHANGE OPTICAL RECORDING MEDIUM AND RECORDING METHOD AND APPARATUS FOR THE SAME

BACKGROUND OF THE INVENTION

1. Field of the Invention

The present invention relates to an optical recording medium comprising a phase-change recording material which is optically changeable by the application thereto of a light beam so as to carry out recording, reproducing, and overwriting of information, and more particularly to a phase-change optical recording medium capable of recording information with high density at high recording linear velocity.

In addition, the present invention also relates to a recording method and apparatus for the above-mentioned phase-change optical recording medium by a Constant Angular Velocity (CAV) system or a Constant Linear Velocity (CLV) system which is achieved by dividing the recording area of the recording medium into a plurality of sections in the radial direction of the recording medium.

2. Discussion of Background

To reproduce or record information in an optical disc with high density by using a laser beam, there is conventionally known the overwriting mode in which recording marks are formed in the optical disc by the application of a plurality of short-length pulse trains as disclosed in Japanese Laid-Open Patent Application 3-185628. However, the above-mentioned overwriting mode has the drawback that the laser power becomes partially insufficient. More specifically, in the case where the optical disc is rotated at a constant number of revolutions, the relative speed of the laser spot is not constant between a recording area at the inner circumference of the disc and that at the outer circumference thereof, viewed in a radial direction of the disc. In such a case, the laser power becomes insufficient in the area where the relative speed of the laser spot is fast. Furthermore, there will occur a new problem that design of the circuit becomes difficult.

To solve the above-mentioned problems, there is a proposal in Japanese Laid-Open Patent Application 6-12674. This proposal is that when an input signal with a particular wave form, for example, an eight to fourteen modulation signal (EFM signal) is given to an optical disc, the wave form of laser is modulated depending upon the linear velocity. More specifically, the laser is modulated into a short-length train of pulses when the linear velocity is slower than a predetermined value (L0); and the laser is modulated into one pulse which is made slightly shorter than the corresponding recording mark when the linear velocity is faster than the aforementioned value (L0).

There is an increasing demand for development of a phase-change optical recording medium and a recording method therefor, which will be able to achieve high-density recording such that the recording capacity thereof is the same or more than that of DVD-ROM, and attain high-speed recording at a linear velocity of 2 times or more (about 7 m/s or more) that of the nominal speed for the DVD-ROM. However, when such an optical recording medium is subjected to the above-mentioned CAV or CLV recording method, it is conventionally known that good recording characteristics cannot be obtained with respect to jitter value by slightly shortening the input pulse width. On the contrary, when the aforementioned conventional method, as proposed in Japanese Laid-Open Patent application 6-12674, of modulating laser into a short-length train of pulses at the lower linear velocity side, good results can be produced. It is considered that, in Japanese Laid-Open Patent Application 6-12674, the above-mentioned recording method is employed because the optical disc employs a composition close to a compound of $Ge_2Sb_2Te_5$.

However, when recording is carried out using the modulated laser with the pulse width being fixed so as not to be deformed at the higher linear velocity side, the pulse width becomes too short in the recording area of the lower linear velocity side, that is, at an inner circumference of the recording medium. In this area, there is a tendency of impairing the jitter value due to insufficient recording power. It is considered that such a phenomenon is also caused by the composition of a recording layer for use in the optical recording medium.

SUMMARY OF THE INVENTION

Accordingly, it is a first object of the present invention to provide a phase-change optical recording medium free from the above-mentioned conventional drawbacks, capable of achieving high-density recording such that the recording capacity thereof is the same or more than that of the DVD-ROM, and attaining high-speed recording at a recording linear velocity in the range of 3.0 to 20 m/s.

A second object of the present invention is to provide a recording method for the above-mentioned phase-change optical recording medium.

A third object of the present invention is to provide a recording apparatus for the above-mentioned phase-change optical recording medium.

The above-mentioned first object of the present invention can be achieved by an optical recording medium for recording information, comprising a phase-change recording layer comprising Sb and Te as essential elements therefor, to which is added at least one element selected from the group consisting of Ag, Au, Cu, Zn, B, Al, Ga, In, Si, Ge, Sn, Pb, N, P, Bi, La, Ce, Gd, and Tb, the recording layer being capable of assuming an amorphous phase changed from a crystalline phase by the application of a laser beam thereto, thereby optically recording information.

In the above-mentioned optical recording medium, the Sb and Te, and at least one element selected from the aforementioned group constitute a eutectic phase-change material, with Sb and Te serving as the main components therefor, and at least one element serving as an additional component in an atomic percentage of 17% or less in the eutectic phase-change material.

It is preferable that there is a difference in reflectance of 30% or more between (a) the crystalline phase and (b) the amorphous phase formed by the application of the laser beam to the crystalline phase at a recording linear velocity ranging from 3 to 20 m/s.

The second object of the present invention can be achieved by a method for optically recording information, using an optical recording medium comprising a phase-change recording layer comprising Sb and Te as essential elements therefor, to which is added at least one element selected from the group consisting of Ag, Au, Cu, Zn, B, Al, Ga, In, Si, Ge, Sn, Pb, N, P, Bi, La, Ce, Gd, and Tb, the recording layer being capable of assuming an amorphous phase changed from a crystalline phase by the application of a laser beam thereto, thereby optically recording information by forming recording marks therein, wherein when the recording marks are formed in the optical recording medium, a light emission wave of the laser beam is converted into a recording pulse train comprising a plurality of on-pulses and each off-pulse subsequent to the on-pulses, with a recording frequency ν (ν=1/Tw where Tw is a window width) being continuously changed corresponding to the location of each of the recording marks in the radial direction of the recording medium, either in the direction from an inner circumference towards an outer circumference of the recording medium, or in the direction from the outer circumference towards the inner circumference of the recording medium.

The third object of the present invention can be achieved by a recording apparatus for recording information comprising laser beam driving circuit means for carrying out a recording method for optically recording information, using an optical recording medium comprising a phase-change recording layer comprising Sb and Te as essential elements therefor, to which is added at least one element selected from the group consisting of Ag, Au, Cu, Zn, B, Al, Ga, In, Si, Ge, Sn. Pb, N, P, Bi, La, Ce, Gd, and Tb, the recording layer being capable of assuming an amorphous phase changed from a crystalline phase by the application of a laser beam thereto, thereby optically recording information by forming recording marks therein, wherein when the recording marks are formed in the optical recording medium, a light emission wave of the laser beam is converted into a recording pulse train comprising a plurality of on-pulses and each off-pulse subsequent to the on-pulses, with a recording frequency ν (ν=1/Tw where Tw is a window width) being continuously changed corresponding to the location of each of the recording marks in the radial direction of the recording medium, either in the direction from an inner circumference towards an outer circumference of the recording medium, or in the direction from the outer circumference towards the inner circumference of the recording medium, a plurality of on-pulses having a pulse width comprising (1) a pulse width portion fixed with an identical time constant (T), and (2) a pulse width portion determined by multiplying the window width (Tw) by a constant, signal generation means for generating a signal corresponding to the time constant, and signal transmission means for transmitting the signal to the driving circuit means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The optical recording medium of the present invention is characterized in that the recording layer comprises Sb and Te as essential elements therefor, to which is added at least one element selected from the group consisting of Ag, Au, Cu, Zn, B, Al, Ga, In, Si, Ge, Sn, Pb, N, P, Bi, La, Ce, Gd, and Tb, with the above-mentioned essential elements of Sb and Te, and at least one element selected from the above-mentioned group constituting a eutectic phase-change material. It is preferable that at least one element selected to serve as an additional component being contained in an atomic percentage of 17% or less in the eutectic phase-change material. As mentioned above, the recording layer for use in the present invention is different from the conventional one comprising a compound substantially the same as $Ge_2Sb_2Te_5$.

Figure 1:
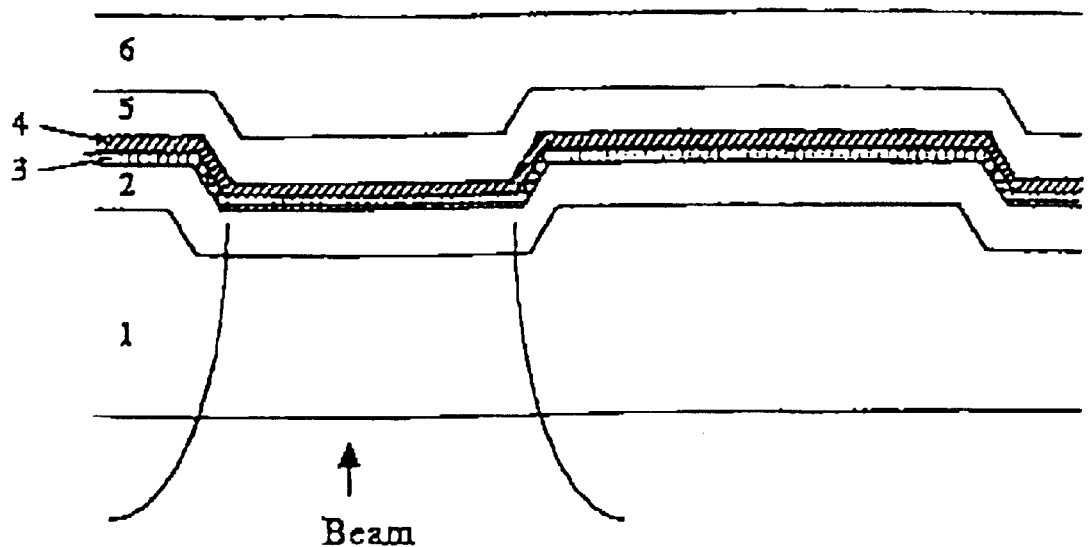
FIG. 1 is a cross-sectional view which shows the structure of a phase-change optical recording medium according to the present invention.

FIG. 1 is a cross-sectional view which shows the structure of a phase-change optical recording medium according to the present invention. In an optical recording medium shown in FIG. 1, a first dielectric layer 2 (serving as a lower protective layer), a recording layer 3, a second dielectric layer 4 (serving as an upper protective layer), and a metal reflection layer 5 (serving as a light reflection and heat dissipation layer) are successively formed on a substrate 1 which bears thereon a guide groove. Further, a protective layer 6 comprising an UV curing resin may be preferably overlaid on the metal reflection layer 5.

In particular, it is preferable that the recording layer 3 comprise a composition of AgInSbTe.

It is desirable that the first or second dielectric layer 2 or 4 comprise a composition of ZnS—$SiO_2$.

It is also desirable that the metal reflection layer 5 comprise a composition of Al—Ti.

As the material for the substrate 1, there can be generally employed glass, ceramic materials, and resins. A resin substrate is most preferable in light of the molding characteristics. Representative examples of the resin for the substrate are polycarbonate resin, acrylic resin, epoxy resin, polystyrene resin, polyethylene resin, polypropylene resin, silicone resin, fluororesin, ABS resin, and urethane resin. Of these resins, the polycarbonate resin is preferably employed because of the advantages over other resins in terms of processability and optical properties. The substrate may be prepared in the form of a disc, card, or sheet.

Exemplary film-forming conditions of each layer in a film-forming chamber are shown below:

First Dielectric Layer (ZnS—$SiO_2$ Layer)

applied electric power: 3 kW argon (Ar) gas pressure: 2 mmTorr (atmospheric pressure in a film-forming chamber)

Recording Layer (AgInSbTe Layer)

applied electric power: 1 kW argon (Ar) gas pressure: 2 mmTorr (atmospheric pressure in a film-forming chamber)

Second Dielectric Layer (ZnS—$SiO_2$ Layer)

applied electric power: 3 kW argon (Ar) gas pressure: 2 mmTorr (atmospheric pressure in a film-forming chamber)

Metal Reflection Layer (Al Layer)

applied electric power: 9 kW argon (Ar) gas pressure: 3 mmTorr (atmospheric pressure in a film-forming chamber)

When the recording layer comprises a composition of AgInSbTe, the presence of the element Ag can effectively improve the recording characteristics and the preservation stability. However, the increase in an amount of Ag lowers the crystalline phase transition speed of the recording layer, so that it becomes difficult to cope with high recording linear velocity. To cope with the rise of recording linear velocity, the content of Sb or In may be increased. However, when the content of Sb is increased to cope with high recording linear velocity, there is a risk that the overwriting characteristics and the preservation reliability under the circumstances of high temperature and high humidity will suddenly drop. When the content of In is increased, it is preferable that the atomic percentage of the element of In be 0.1 or less.

The first dielectric layer and the second dielectric layer are formed by a variety of vapor growth methods, for example, vacuum deposition, sputtering, and electron beam evaporation. The thickness of the first or second dielectric layer varies depending on the function of the layer as a heat-resistant layer or multiple-interference layer. It is preferable that the first dielectric layer have a thickness of 50 to 110 nm, or 170 to 215 nm. When the thickness of the first dielectric layer is less than 50 nm, the first dielectric layer cannot work to protect the substrate from the influence caused by heat accumulation in the recording layer. When the thickness of the first dielectric layer is more than 215 nm, the peeling of the first dielectric layer from the interface can be prevented. It is also preferable that the thickness of the second dielectric layer be in the range of 10 to 30 nm. The second dielectric layer with such a thickness, the decrease of recording sensitivity and the excessive heat accumulation can be prevented.

To erase the recorded information without fail in the course of overwriting operation, the conventional recording material needs delicate control of temperature so that the recording layer is heated at around the crystallization temperature thereof. In contrast to this, the erasing characteristics of the optical recording medium of the present invention are excellent. Further, consideration may be just given to rapid cooling after the recording layer is irradiated with a laser beam in the course of recording. Therefore, a stable recording mark can be formed in the optical recording medium of the present invention by both the CAV and CLV recording methods.

According to the present invention, recording marks are formed in the above-mentioned optical recording medium by converting a light emission wave of the laser beam into a recording pulse train comprising a plurality of on-pulses and each off-pulse subsequent to the on-pulses, with a recording frequency ν (ν=1/Tw where Tw is a window width) being continuously changed corresponding to the location of each of the recording marks in the radial direction of the recording medium, either in the direction from an inner circumference towards an outer circumference of the recording medium, or in the direction from the outer circumference towards the inner circumference of the recording medium.

In the aforementioned recording method, there may be a difference in reflectance of 30% or more between (a) the crystalline phase and the amorphous phase formed by the application of the laser beam to the crystalline phase at a recording linear velocity ranging From 3 to 20 m/s.

Figure 2:
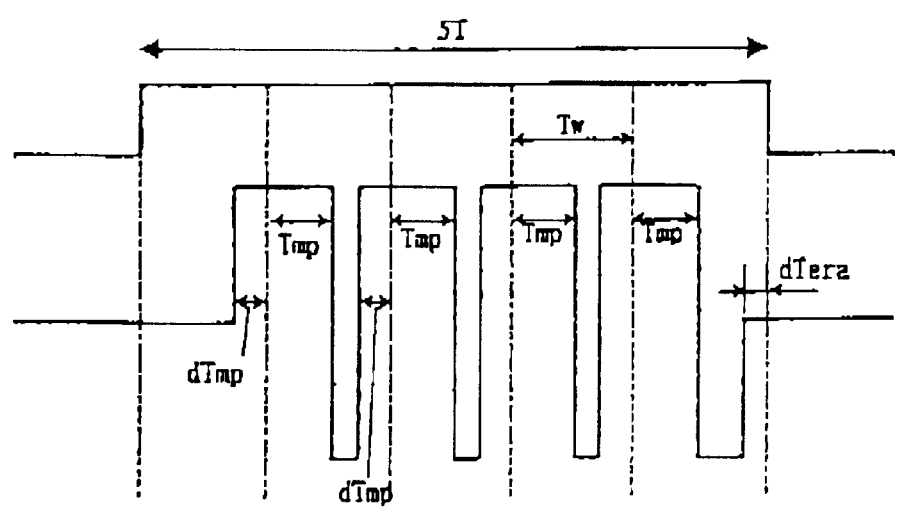
FIG. 2 is a chart in explanation of the recording method according to the present invention.

FIG. 2 is a chart in explanation of one embodiment of the above-mentioned recording method. In this case, the recording marks are formed in the recording medium in such a manner that a plurality of on-pulses has a pulse width comprising a pulse width portion (dTmp) fixed with an identical time constant (T), and a pulse width portion (Tmp) determined by multiplying the window width (Tw) by a constant.

Figure 3:
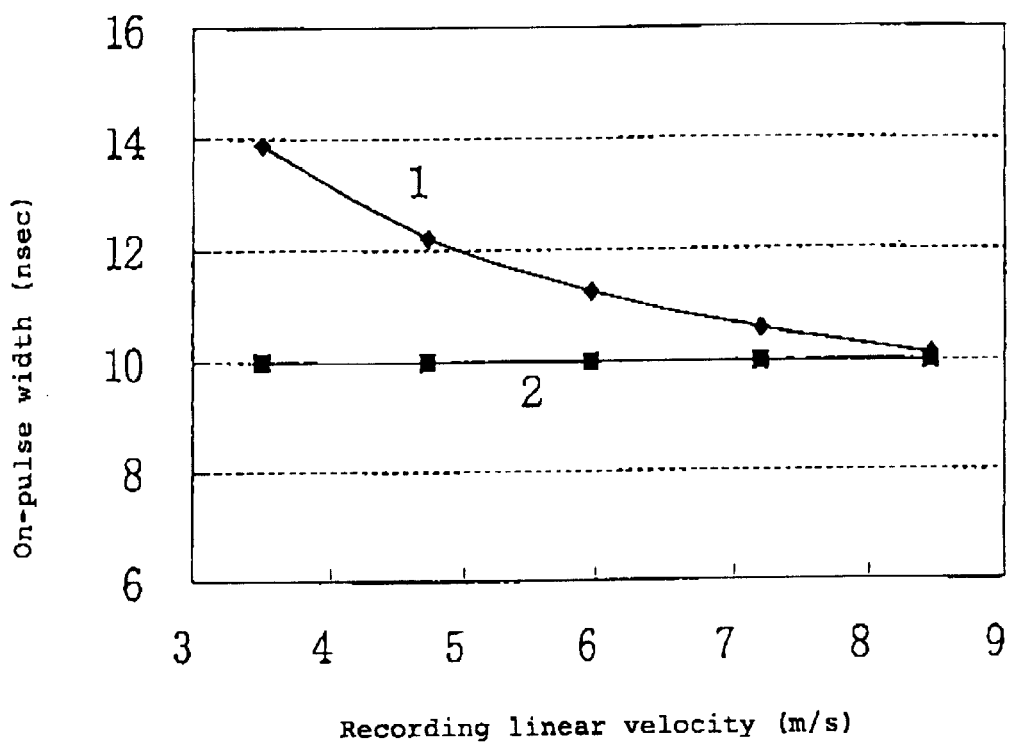
FIG. 3 is a chart which shows the relationship between the recording linear velocity and the on-pulse width.

When the above-mentioned recording method as shown in FIG. 2, the pulse width of the on-pulses varies depending upon the recording linear velocity, as indicated by a graph 1 shown in FIG. 3,. In comparison with the pulse width obtained by the above-mentioned recording method according to the present invention, the pulse width obtained by the conventional recording method consists of only the pulse width portion (Tmp), so that the pulse width is constant regardless of the recording linear velocity, as indicated by a graph 2 in FIG. 3.

As is apparent from the graph 1 shown in FIG. 3, the above-mentioned recording method of the present invention can increase the pulse width at the lower linear velocity side, in other words, at the inner circumference of the recording medium. The result is that a stable recording mark can be formed in the recording medium by any of the CAV or CLV recording system. Namely, it is possible to prevent the deterioration of jitter performance which is conventionally caused in such a way that the recording power becomes insufficient due to the narrow pulse width at the inner circumference of the recording medium.

With respect to the pulse width portion (Tmp) in FIG. 2, it is preferable that the ratio of the constant to the window width (Tw) is 0.5 or less. When the aforementioned ratio is 0.5 or less, a stable pulse train for driving laser diode (LD) can be obtained. To be more specific, the off-pulses become shorter as the recording linear velocity becomes higher, in other words, as the window width becomes narrower. In such a case, a pulse decay time constant for laser diode (LD) cannot be secured, so that it becomes difficult to perform stable irradiation of the recording medium with the laser beam.

Furthermore, with respect to the pulse width portion (dTmp) fixed with an identical time constant (T), it is preferable that the ratio of the time constant (T) to Tw be 0.8 or less in a maximum recording frequency used, and 0.2 or more in a minimum recording frequency used. When such threshold values are provided, the pulse width can be inhibited from becoming extremely narrow at the lower linear velocity side, so that deterioration of jitter performance due to insufficient recording power can be effectively prevented.

In the case of the graph 1 in FIG. 3, both thresholds values are satisfied. As a result, the duty ratio becomes larger at the lower linear velocity side, and therefore the jitter performance becomes better in the recording method indicated by the graph 1 than in the conventional recording method indicated by the graph 2. In FIG. 3, this is expressed by the pulse width instead of the duty ratio for convenience.

The recording method according to the present invention may employ in combination a recording mode (a) in which a plurality of on-pulses has a pulse width comprising a pulse width portion (dTmp) fixed with an identical time constant (T), and a pulse width portion (Tmp) determined by multiplying the window width (Tw) by a constant, and a recording mode (b) in which a plurality of on-pulses has such a pulse width that is adjusted to have a constant duty ratio to the window width (Tw) in such a manner that the recording mode (a) and the recording mode (b) are switched at an intermediate recording frequency between a maximum recording frequency and a minimum recording frequency.

Figure 4:
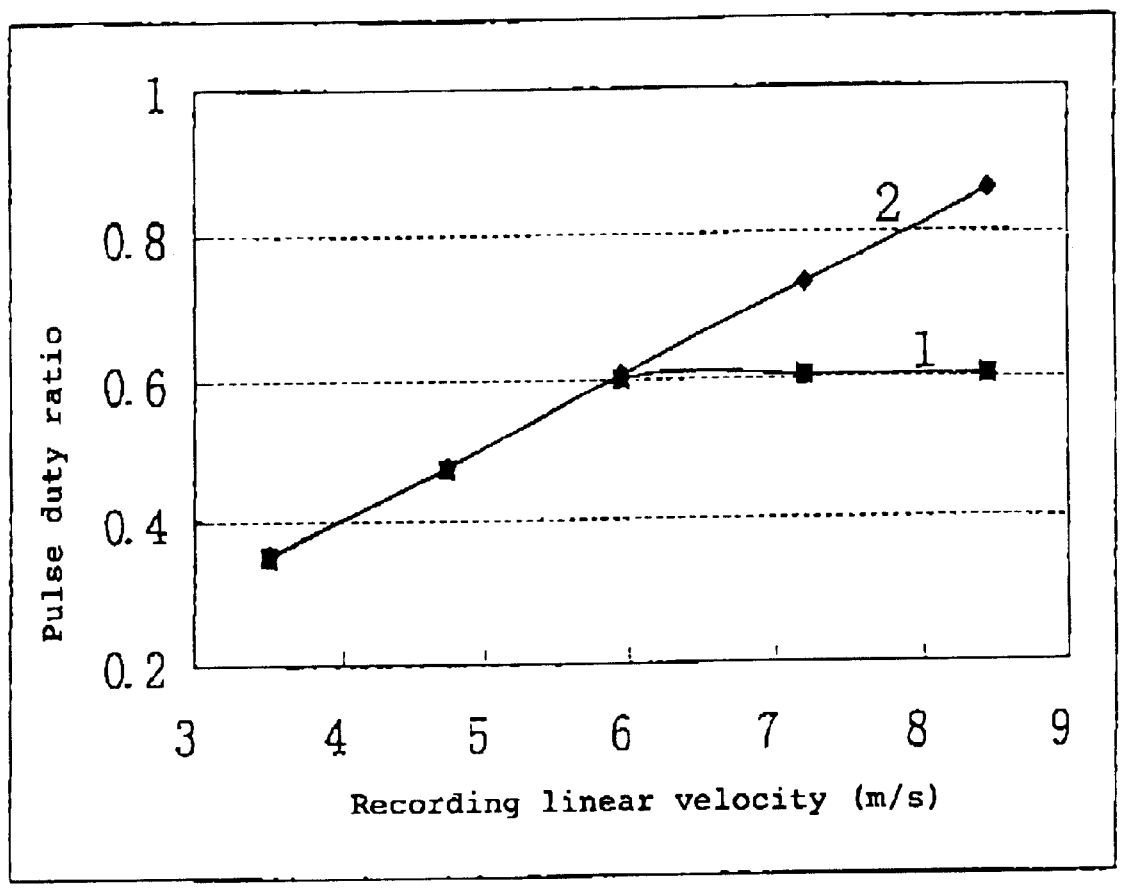
FIG. 4 is a chart which shows the relationship between the recording linear velocity in the recording method employed in Example 2 and the pulse duty ratio thereof.

A graph 1 in FIG. 4 shows the relationship between the duty ratio to the pulse width (Tw) at each linear velocity when the above-mentioned recording method using the recording mode (a) and the recording mode (b) in combination is carried out.

When compared with the graph 1, according to a graph 2 of the conventional recording method, an off-pulse portion becomes shorter as the window width decreases at the higher linear velocity. Therefore, a pulse decay time constant of LD cannot be secured, so that stable irradiation of the recording medium with the laser beam cannot be achieved. At the lower linear velocity side, the pulse width becomes too narrow to obtain sufficient recording power, so that the jitter performance is lowered.

Figure 6:
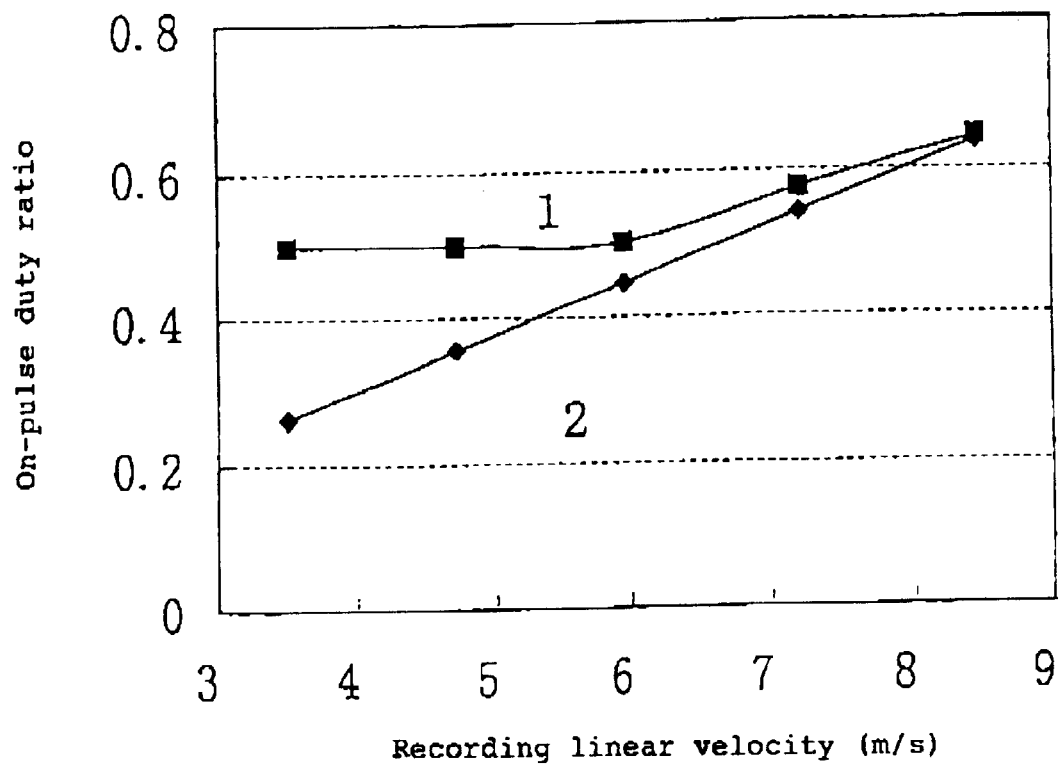
FIG. 6 is a chart which shows the relationship between the recording linear velocity in the recording method employed in Example 3 and the on-pulse duty ratio.

It is preferable that the recording mode (a) be carried out in a range between the intermediate recording frequency and the minimum recording frequency. This case is indicated by a graph 1 in FIG. 6. It is possible to prevent the deterioration of jitter values due to insufficient recording power when the pulse width becomes too narrower at the lower linear velocity side. A graph 2 in FIG. 6 shows the relationship between the linear velocity and the duty ratio when the conventional recording method is employed.

To effectively prevent the above-mentioned drawbacks, it is preferable that the constant duty ratio in the recording mode (b) be 0.8 or less.

To achieve the aforementioned recording methods, a recording apparatus of the present invention comprises laser beam driving circuit means, signal generation means for generating a signal corresponding to the aforementioned time constant, and signal transmission means for transmitting the signal to the driving circuit means owing to such a recording apparatus, the pulse application time constant can be smoothly changed. It is said that the recording apparatus particularly suitable for CAV recording can be obtained.

Other features of this invention will become apparent in the course of the following description of exemplary embodiments, which are given for illustration of the invention and are not intended to be limiting thereof.

EXAMPLE 1

Fabrication of Phase-change Optical Recording Medium

On a polycarbonate substrate, a first dielectric layer (ZnS—SiO$_2$), a recording layer (AgInSbTe), a second dielectric layer (ZnS—SiO$_2$), and a metal reflection layer (Al—Ti) were successively overlaid by the sputtering method. An UV-curing resin was coated on the metal reflection layer by spin coating to provide a protective layer thereon.

Each of the above-mentioned layers was formed under the following film-forming conditions:

First Dielectric Layer (ZnS—SiO$_2$ Layer)

applied electric power: 3 kw argon (Ar) gas pressure: 2 mmTorr (atmospheric pressure in a film-forming chamber)

Recording Layer (AgInSbTe Layer)

applied electric power: 1 kW argon (Ar) gas pressure: 2 mmTorr (atmospheric pressure in a film-forming chamber)

Second Dielectric Layer (ZnS—SiO$_2$ Layer)

applied electric power: 3 kW argon (Ar) gas pressure: 2 mmTorr (atmospheric pressure in a film-forming chamber)

Metal Reflection Layer (Al—Ti Layer)

applied electric power: 9 kw argon (Ar) gas pressure: 2 mmTorr (atmospheric pressure in a film-forming chamber)

Thus, a phase-change optical recording medium No. 1 according to the present invention was fabricated.

Using the optical recording medium No. 1, the CAV recording was carried out in such a manner that the recording linear velocities were set to 3.49 m/sec at the innermost circumference and 8.5 m/sec at the outermost circumference. In this case, a plurality of on-pulses was controlled so that a pulse width was composed of a pulse width portion fixed with a time constant of 8 nsec, and a pulse width portion determined by multiplying the window width (Tw) by a constant of 1/6, as shown in FIG. 2. A portion (dTera) shown in FIG. 2 was set by multiplying the window width (Tw) by a constant of 1/6. In this case, the window width was multiplied by a positive constant, that is, +1/6. It was also possible to multiply the window width by a negative constant, that is, −1/6. Further, the constant represented by 1/n where n is an integer is favorable in light of the circuit.

Figure 5:
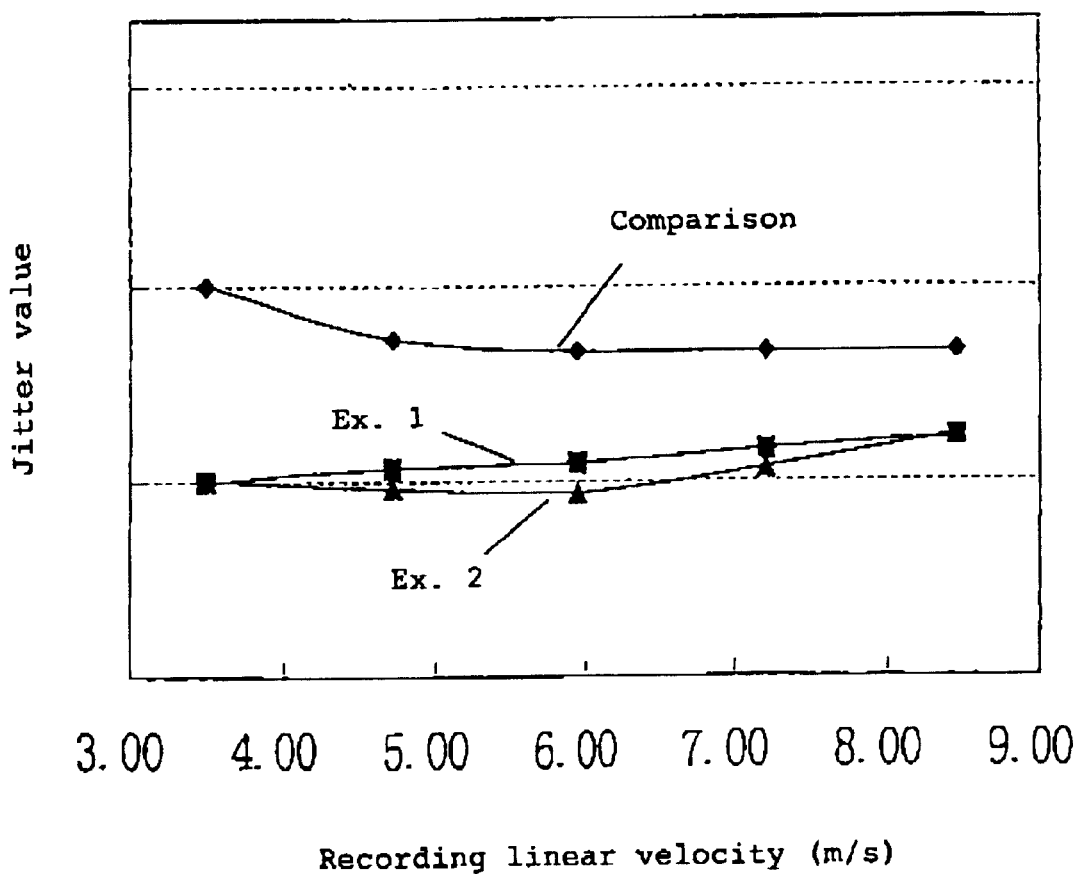
FIG. 5 is a chart which shows the jitter performance in the recording methods employed in Examples 1 and 2.

The results of the recording operation are shown in FIG. 5. As is apparent from the graph in FIG. 5, the jitter value can be reduced at the lower linear velocity side, thereby achieving stable recording.

For comparison, when recording was carried out by merely fixing the time constant, as shown in FIG. 5, the jitter value increased as a whole, in particular, at the lower linear velocity side.

EXAMPLE 2

Using the same phase-change optical recording medium No. 1 fabricated in Example 1, the recording was carried out by combining the previously mentioned recording mode (a) and recording mode (b). To be more specific, the recording mode (a) was carried out in such a manner that the pulse width of a plurality of on-pulses was composed of a pulse width portion fixed with a time constant of 11.5 nsec, and a pulse width portion determined by multiplying the window width (Tw) by a constant of 1/6, as shown in FIG. 2. The recording mode (a) was adapted from the innermost circumference of the recording medium up to a recording position of which the window width was 1.7 times that at the innermost circumference. In other words, the recording mode (a) was switched to the recording mode (b) at the position around half the distance of a radius of the recording medium. At this position, the recording linear velocity was about 6 m/sec.

Outward from this position, the recording mode (b) was carried out with the pulse width of a plurality of on-pulses being adjusted to have a constant duty ratio to the window width of 0.6.

In this case, the duty ratio varied depending upon the recording linear velocity as indicated by a graph 1 shown in FIG. 4. In contrast to the graph 1, a graph 2 shows the relationship between the duty ratio and the recording linear velocity when the recording mode (a) employed in Example 2 was adapted up to the outermost circumference. In this case, as indicated by the graph 2, the duty ratio exceeded 0.8 at the position of which the window width was 2.2 times that of the innermost circumference, and the recording was impossible outerward therefrom.

The results of the recording operation are shown in FIG. 5 in terms of the jitter value depending upon the recording linear velocity.

EXAMPLE 3

Using the same phase-change optical recording medium No. 1 fabricated in Example 1, the recording was carried out by combining the previously mentioned recording mode (a) and recording mode (b). To be more specific, the recording mode (b) was first carried out with the pulse width of a plurality of on-pulses being adjusted to have a constant duty ratio to the window width of 0.5.

The recording mode (b) was adapted from the innermost circumference of the recording medium up to a position of which the window width was 1.7 times that of the innermost circumference of the recording medium. In other words, the recording mode (b) was switched to the recording mode (a) at the position around half the distance of a radius of the recording medium. At this position, the recording linear velocity was about 6 m/sec.

Outerward from this position, the recording mode (a) was carried out in such a manner that the pulse width of a plurality of on-pulses was composed of a pulse width portion fixed with a time constant of 8 nsec, and a pulse width portion determined by multiplying the window width (Tw) by a constant of 1/6.

As a result, the jitter value was almost the same as that obtained in Example 2. Japanese Patent Application No. 11-131926 filed May 12, 1999 is hereby incorporated by reference.

What is claimed is:

1. A method for optically recording information, using an optical recording medium comprising a phase-change recording layer comprising Sb and Te as essential elements therefor, to which is added at least one element selected from the group consisting of Ag, Au, Cu, Zn, B, Al, Ga, In, Si, Ge, Sn, Pb, N, P, Bi, La, Ce, Gd, and Tb, said recording layer being capable of assuming an amorphous phase changed from a crystalline phase by the application of a laser beam thereto, thereby optically recording information by forming recording marks therein, wherein when said recording marks are formed in said optical recording medium, a light emission wave of said laser beam is converted into a recording pulse train comprising a plurality of on-pulses and each off-pulse subsequent to said on-pulses, with a recording frequency $v$ ($v=1/Tw$ where Tw is a window width) being continuously changed corresponding to the location of each of said recording marks in the radial direction of said recording medium, either in the direction from an inner circumference towards an outer circumference of said recording medium, or in the direction from the outer circumference towards the inner circumference of said recording medium.

2. The recording method as claimed in claim 1, wherein there is a difference in reflectance of 30% or more between (a) said crystalline phase and said amorphous phase formed by the application of said laser beam to said crystalline phase at a recording linear velocity ranging from 3 to 20 m/s.

3. The recording method as claimed in claim 1, wherein said plurality of on-pulses has a pulse width comprising (1) a pulse width portion fixed with an identical time constant (T), and (2) a pulse width portion determined by multiplying said window width (Tw) by a constant.

4. The recording method as claimed in claim 3, wherein in said pulse width portion fixed with an identical time constant (T), the ratio of said time constant (T) to Tw is 0.8 or less in a maximum recording frequency used, and 0.2 or more in a minimum recording frequency used.

5. The recording method as claimed in claim 3, wherein in said pulse width portion determined by multiplying said window width (Tw) by a constant, the ratio of said constant to said window width is 0.5 or less.

6. The recording method as claimed in claim 2, using in combination:

(a) a recording mode in which said plurality of on-pulses has a pulse width comprising (1) a pulse width portion fixed with an identical time constant (T), and (2) a pulse width portion determined by multiplying said window width (Tw) by a constant, and (b) a recording mode in which said plurality of on-pulses has such a pulse width that is adjusted to have a constant duty ratio to said window width (Tw), in such a manner that said recording mode (a) and said recording mode (b) are switched at an intermediate recording frequency between a maximum recording frequency and a minimum recording frequency.

7. The recording method as claimed in claim 6, wherein said recording mode (a) is carried out in a range between said intermediate recording frequency and said minimum recording frequency.

8. The recording method as claimed in claim 6, wherein said constant duty ratio in said recording mode (b) is 0.8 or less.

9. A recording apparatus for recording information comprising:

laser beam driving circuit means for carrying out a recording method for optically recording information, using an optical recording medium comprising a phase-change recording layer comprising Sb and Te as essential elements therefor, to which is added at least one element selected from the group consisting of Ag, Au, Cu, Zn, B, Al, Ga, In, Si, Ge, Sn, Pb, N, P, Bi, La, Ce, Gd, and Tb, said recording layer being capable of assuming an amorphous phase changed from a crystalline phase by the application of a laser beam thereto, thereby optically recording information by forming recording marks therein, wherein when said recording marks are formed in said optical recording medium, a light emission wave of said laser beam is converted into a recording pulse train comprising a plurality of on-pulses and each off-pulse subsequent to said on-pulses, with a recording frequency $v$ ($v=1/Tw$ where Tw is a window width) being continuously changed corresponding to the location of each of said recording marks in the radial direction of said recording medium, either in the direction from an inner circumference towards an outer circumference of said recording medium, or in the direction from the outer circumference towards the inner circumference of said recording medium, said plurality of on-pulses having a pulse width comprising (1) a pulse width portion fixed with an identical time constant (T), and (2) a pulse width portion determined by multiplying said window width (Tw) by a constant, signal generation means for generating a signal corresponding to said time constant, and signal transmission means for transmitting said signal to said driving circuit means.

10. The recording apparatus as claimed in claim 9, wherein (a) a recording mode in which said plurality of on-pulses has a pulse width comprising (1) a pulse width portion fixed with an identical time constant (T), and (2) a pulse width portion determined by multiplying said window width (Tw) by a constant, and (b) a recording mode in which said plurality of on-pulses has such a pulse width that is adjusted to have a constant duty ratio to said window width (Tw), are used in such a manner that said recording mode (a) and said recording mode (b) are switched at an intermediate recording frequency between a maximum recording frequency and a minimum recording frequency.

* * * * *